July 1, 1941.  M. SAINICH  2,247,669

BARBECUE ROASTER

Filed Aug. 19, 1940

Martin Sainich
INVENTOR

BY Victor J. Evans & Co.
ATTORNEYS

Patented July 1, 1941

2,247,669

UNITED STATES PATENT OFFICE 2,247,669

BARBECUE ROASTER

Martin Sainich, Livingston, Mont.

Application August 19, 1940, Serial No. 353,295

4 Claims. (Cl. 53—5)

This invention relates to a barbecue roaster and has for an object to provide an inexpensive roaster which will be so constructed as to be easily cleaned and kept in a sanitary condition and which will further have bars which may be easily removed endwise from the walls of the pan, but which, when in use, are simultaneously held against displacement to permit burning of the roast meat during the roasting process accurately and conveniently.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1:
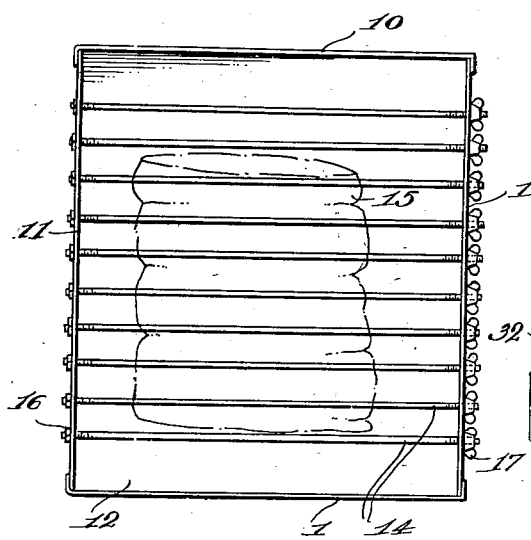
Figure 1 is a plan view of a barbecue roaster constructed in accordance with the invention.

Referring now to the drawing in which like characters of reference designate similar parts in the various views, one form of the barbecue roaster comprises a pan of substantially rectangular contour having relatively low front and rear end walls 10, relatively high side walls 11 and a bottom wall 12. The pan is formed of sheet metal.

Each of the side walls 11 is formed substantially midway of its height with a row of equally spaced apertures 13. The row extends substantially through the entire length of the side walls parallel with the bottom wall and the rows of openings of both side walls are disposed opposite each other and above the tops of the front and rear end walls to permit access to the pan below the hereinafter described rods for basting purposes.

Figure 2:
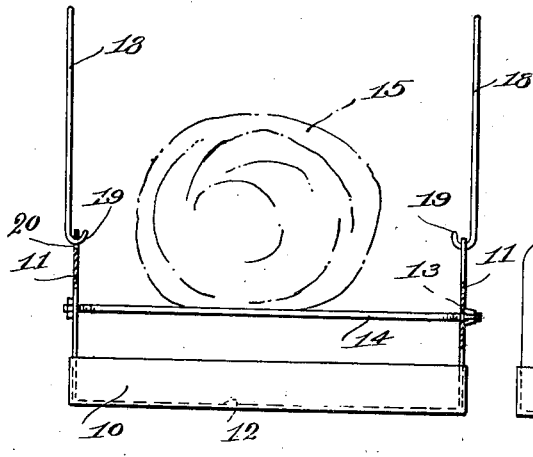
Figure 2 is a front elevation of the roaster shown in Figure 1.
Figure 3:
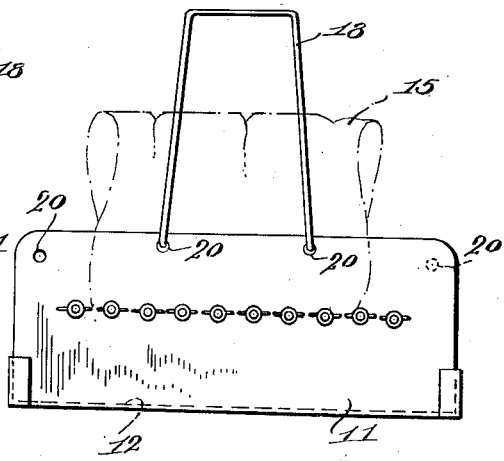
Figure 3 is a side elevation of the roaster shown in Figure 1.

In the form of the invention shown in Figures 1, 2 and 3 removable metal rods 14 are mounted in the oppositely alined openings 13 and extend between the sides of the pan to support the meat 15 to be roasted between the upper portion of the side walls 11 and above the front and rear end walls 10. The rods are threaded at their end portions. A conventional nut 16 is threaded onto one end of each rod outside of the adjacent side wall 11 and a wing nut 17 is threaded onto the other end of the rod outside of the adjacent side wall 11. Removal of the wing nuts permits the rods being removed endwise from the openings 13 so that the rods may be cleaned and the pan may be cleaned conveniently and kept in a sanitary condition. A pair of inverted U-shaped handles 18 are provided to manipulate the pan each handle having its legs terminating in upwardly opening hooks 19 which are engaged through openings 20 in the side walls adapted to interchangeably receive the hooks.

Figure 4:
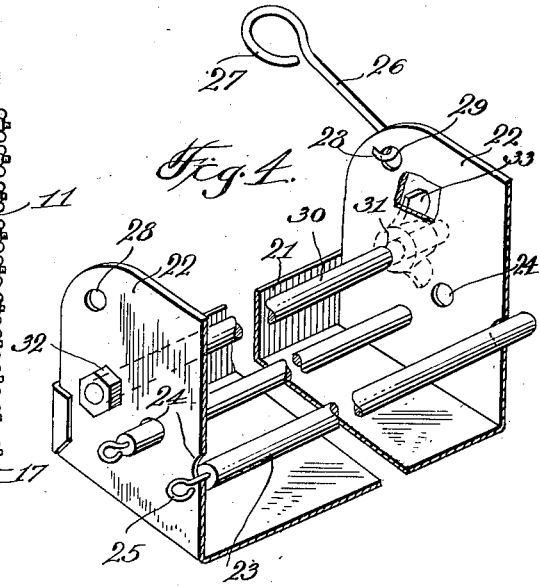
Figure 4 is a fragmentary perspective view of another form of the barbecue roaster.

In the form of the invention shown in Figure 4 the pan is provided with low end walls 21 and high side walls like the pan in the other form of the invention. However, in this form of the invention wood rods 23 are employed in lieu of metal rods and these rods are engaged in rows of equally spaced apertures 24 formed in the side walls 22, as previously described. Each wood rod is equipped at one end with a screw eye 25 for removal and replacement of the rod for cleaning and which in normal position will engage the adjacent side wall 22 and permit dislodgement of the rod when the pan or roast is being manipulated.

For manipulating the pan a handle 26 is provided having an eye 27 at one end forming a grip and a hook 28 at the opposite end adapted to be interchangeably engaged in openings 29 formed in the side wall above the openings 24.

Again in the form of the invention shown in Figure 4 the high side walls 22 are reinforced against spreading apart by a spacer rod 30 which is engaged through openings 31 in the walls 22 adjacent to the rows of openings 24. A conventional nut 32 is threaded onto one end of the reinforcing rod and a wing nut 33 is threaded onto the other end of the rod to removably hold the rod in place.

From the above description it is thought that the construction and operation of the invention will be fully understood without further explanation.

What is claimed is:

1. A barbecue roaster comprising a substantially rectangular pan having two opposite walls of greater height than the two other opposite walls, parallel rods removably disposed in oppositely alined rows of openings in said higher walls above the lower walls to permit access to the pan below the rods, and means for preventing accidental endwise displacement of the rods in one direction.

2. The structure of claim 1 and in which said means comprises nuts threaded onto the ends of the rods and bearing against the outer faces of said higher walls.

3. The structure of claim 1 and in which said rods are formed of wood, and said means comprising screw eyes.

4. The structure of claim 1 and in which the two higher walls are braced by metal brace rods detachably connected to said walls and disposed parallel to the first-named rods.

MARTIN SAINICH.